(12) United States Patent
Blomqvist

(10) Patent No.: US 7,454,971 B2
(45) Date of Patent: Nov. 25, 2008

(54) OSCILLATING MICRO-MECHANICAL SENSOR OF ANGULAR VELOCITY

(75) Inventor: Anssi Blomqvist, Vantaa (FI)

(73) Assignee: VTI Technologies Oy, Vantaa (FI)

( * ) Notice: Subject to any disclaimer, the term of this patent is extended or adjusted under 35 U.S.C. 154(b) by 222 days.

(21) Appl. No.: 11/318,897

(22) Filed: Dec. 28, 2005

(65) Prior Publication Data
US 2006/0156814 A1 Jul. 20, 2006

(30) Foreign Application Priority Data
Dec. 31, 2004 (FI) .................................. 20041708

(51) Int. Cl.
*G01C 19/00* (2006.01)

(52) U.S. Cl. .............. 73/504.12; 73/504.02; 73/504.03; 73/504.08; 73/514.15; 73/514.21

(58) Field of Classification Search .............. 73/504.12, 73/504.15, 504.02, 504.03, 504.08, 504.18, 73/514.01, 514.15, 514.21–514.24, 514.32
See application file for complete search history.

(56) References Cited

U.S. PATENT DOCUMENTS

| 5,889,208 | A | 3/1999 | Nose |
| 6,294,400 | B1 | 9/2001 | Stewart et al. |
| 6,391,673 | B1 * | 5/2002 | Ha et al. ........................ 438/51 |
| 6,513,380 | B2 * | 2/2003 | Reeds et al. .............. 73/504.12 |
| 6,561,028 | B1 * | 5/2003 | Aigner et al. ............. 73/504.11 |
| 6,939,473 | B2 * | 9/2005 | Nasiri et al. .................... 216/2 |
| 2003/0101815 | A1 * | 6/2003 | Orsier ....................... 73/504.12 |
| 2004/0206176 | A1 * | 10/2004 | Willig et al. .............. 73/504.12 |
| 2004/0250620 | A1 * | 12/2004 | Nicu et al. ................ 73/504.12 |
| 2004/0255672 | A1 * | 12/2004 | Knowles et al. ........... 73/504.12 |
| 2006/0219006 | A1 * | 10/2006 | Nasiri et al. .............. 73/504.12 |
| 2006/0288779 | A1 * | 12/2006 | Cardarelli ................ 73/504.02 |
| 2007/0245826 | A1 * | 10/2007 | Cardarelli ................ 73/504.12 |
| 2008/0115579 | A1 * | 5/2008 | Seeger et al. ............. 73/504.12 |

FOREIGN PATENT DOCUMENTS

| DE | 44 31 232 A1 | 3/1996 |
| DE | 4431232 A1 | 3/1996 |
| JP | 5-264282 | 12/1993 |
| JP | 5264282 | 1/2001 |
| WO | WO 95/29383 | 11/1995 |
| WO | WO 97/37196 | 10/1997 |
| WO | WO 2005/031257 A3 | 4/2005 |
| WO | WO 2005/043078 A2 | 5/2005 |

* cited by examiner

*Primary Examiner*—Hezron E. Williams
*Assistant Examiner*—Gunnar J Gissel
(74) *Attorney, Agent, or Firm*—Squire, Sanders & Dempsey, LLP

(57) ABSTRACT

The invention relates to measuring devices used in measuring angular velocity, and, more specifically, to oscillating micro-mechanical sensors of angular velocity. In the sensor of angular velocity according to the present invention seismic masses (1), (2), (36), (37) are connected to support areas by means of springs or by means of springs and stiff auxiliary structures, which give the masses (1), (2), (36), (37) a degree of freedom in relation to an axis of rotation perpendicular to the plane of the wafer formed by the masses, and in relation to at least one axis of rotation parallel to the plane of the wafer. The structure of the sensor of angular velocity according to the present invention enables reliable and efficient measuring particularly in compact oscillating micro-mechanical sensors of angular velocity.

23 Claims, 9 Drawing Sheets

OSCILLATING MICRO-MECHANICAL SENSOR OF ANGULAR VELOCITY

FIELD OF THE INVENTION

The invention relates to measuring devices used in measuring angular velocity and, more specifically, to oscillating micro-mechanical sensors of angular velocity. The invention aims at providing an improved sensor structure enabling reliable and efficient measuring, particularly in compact oscillating micro-mechanical angular velocity sensor solutions.

BACKGROUND OF THE INVENTION

Measuring based on an oscillating sensor of angular velocity has proved to have a simple principle and to provide a reliable way of measuring angular velocity. The operating principle most generally used in oscillating sensors of angular velocity is the so called tuning fork principle.

In an oscillating sensor of angular velocity, a certain known primary motion is generated and maintained in the sensor. On the other hand, the desired motion to be measured by means of the sensor is detected as a deviation in the primary motion. In the tuning fork principle, the primary motion is the opposite phase oscillation of two vibrating linear resonators.

An external angular velocity affecting the sensor in a direction perpendicular to the direction of motion of the resonators induces Coriolis forces on the masses in opposite directions. The Coriolis force, proportional to the angular velocity, is detected either directly from the masses, or the masses are connected to the same rotation shaft, and then the detection motion is an angular oscillation in the direction of the angular velocity axis.

Resistance to vibration and impact are central features required of sensors of angular velocity. Particularly in certain demanding applications, like, for example, electronic stability programs in the automotive industry, these requirements are extremely tight. Even a hard blow, like, for example, the external impact caused by a stone, or the vibration caused by a car audio player, should not affect the output of the sensor of angular velocity.

In measuring according to the tuning fork principle, the detection motion is angular oscillation or differential linear oscillation, and thus, any external linear acceleration will not link to the detecting resonator in an ideal structure. Unavoidably, however, angular accelerations also to the axis of detection of the sensor of angular velocity will always be generated from impacts and vibrations, due to vibration in the material and the support. Thus, the motion of the detecting resonator will unavoidably be disturbed, and this causes deviations in the output signal of the sensor of angular velocity, particularly when the frequency of the interference is close to the operating frequency of the sensor.

Sensors of angular velocity according to prior art have also been developed, in which both the primary motion and the detection motion are angular oscillations. One such prior art solution for a sensor of angular velocity is described in e.g. U.S. Pat. No. 6,349,597. The primary motion in the solution for a sensor of angular velocity described in the U.S. patent is implemented as an angular oscillation about an axis z occurring in the plane of the disk. The angular velocity detection motion is correspondingly measured as an inclination of the disk in relation to the plane z. In the presented solution the moment caused by the angular velocity is, in addition to being proportional to the mass of the oscillating structure, proportional to the square of the length of the mass in the direction of the axis of angular velocity.

The prior art solution described above, however, exhibits almost the same degree of sensitivity to external mechanical interference as structures based on the tuning fork principle. Only the primary motion, being an angular oscillation, is less sensitive to linear accelerations, but the primary motion is, anyhow, clearly less sensitive to external forces than the detection motion.

The measuring principles of micro-mechanical sensors of angular velocity generally known at the present time are not the best possible ones in view of sensitivity to vibration. Thus, an object of the invention is to provide a structure for an oscillating sensor of angular velocity, which is appreciably less sensitive to the linkage of mechanical interference compared with solutions according to prior art.

SUMMARY OF THE INVENTION

The object of the present invention is to provide such an improved oscillating sensor of angular velocity, which enables reliable and efficient measuring particularly in compact oscillating angular velocity sensor solutions, and which is considerably less sensitive to the linkage of mechanical interference compared with prior art solutions.

According to the present invention, an oscillating micro-mechanical sensor of angular velocity is provided, comprising two seismic masses attached to the body of the sensor component at support areas, and a connecting spring located between the masses such, that in the sensor of angular velocity the primary motion, which has to be generated, is an opposite phase angular oscillation of the two seismic masses about the support areas, the seismic masses are connected to each other by means of at least one bending spring, mechanically synchronizing their primary motion, and that the seismic masses are attached to the support areas by means of springs or by means of springs and stiff auxiliary structures, giving the masses a degree of freedom in relation to an axis of rotation perpendicular to the disk formed by them and in relation to at least one axis of rotation in the direction of the plane of the disk.

Preferably, the sensor of angular velocity is a sensor of angular velocity measuring angular velocity in relation to one axis, in which sensor two seismic masses are attached to the body of the sensor component by means of at least two attachment spots. Further, preferably, the bending spring is essentially higher than it is wide.

Preferably, the sensor of angular velocity comprises rotary springs for the primary motion, which springs have flexibility in relation to the primary motion, and torsion springs for the detection motion, which springs have flexibility in relation to the torsion oscillation caused by the torque moment introduced by an external angular velocity.

Preferably, the oscillation caused by the external angular velocity is capacitively detected by means of electrodes located above or underneath the masses. Further, preferably, the electrodes are grown onto the inner surface of a wafer hermetically closing the sensor structure.

Preferably, the sensor of angular velocity comprises, attached to the center of the spring connecting the masses of the sensor of angular velocity, a second bending spring extending essentially in the same direction.

Preferably, the masses are attached to the body by means of attachment spots and, in addition, by means of attachment spots installed at the center. Alternatively, the masses are attached to the body by means of attachment spots and, in addition, by means of attachment spots installed in the corners or at the edge. Further, alternatively, the masses are attached to the body by means of attachment spots, which attachment spots, on one side, are attached to the masses by means of designed stiff auxiliary structures. Further, alternatively, the masses are attached to the body by means of attachment spots, which attachment spots, on one side, are attached to the masses by means of springs. Further, alternatively, the masses are attached to the body by means of attachment spots installed at the center of the ends and, additionally, by means of attachment spots, which attachment spots, on one side, are attached to the masses by means of springs.

Preferably, the sensor of angular velocity comprises strain relieving structures. Preferably, the sensor of angular velocity comprises a comb structure. Preferably, the sensor of angular velocity comprises radial comb structures.

Preferably, the sensor of angular velocity is a sensor of angular velocity measuring angular velocity in relation to two axes, in which sensor the two seismic masses are attached to the body of the sensor component at two attachment spots. Preferably, the bending spring is essentially higher than it is wide.

Preferably, the sensor of angular velocity comprises
rotary springs for the primary motion, which springs have flexibility in relation to the primary motion,
torsion springs for the detection motion in a first direction, which springs have flexibility in relation to the detection motion in the first direction, and
torsion springs for the detection motion in a second direction, which springs have flexibility in relation to the detection motion in the second direction.

Preferably, the oscillation caused by the external angular velocity is capacitively detected by means of electrodes located above or underneath the masses. Further, preferably, the electrodes are grown onto the inner surface of a wafer hermetically closing the sensor structure.

Preferably, the attachment spots are joined in an anodic manner to the wafer hermetically closing the sensor structure. Alternatively, the attachment spots are joined by means of a fusion joint to the wafer hermetically closing the sensor structure.

BRIEF DESCRIPTION OF THE DRAWINGS

Below, the present invention and its preferable embodiments will be described in detail with exemplifying reference to the attached figures, in which.

DETAILED DESCRIPTION OF THE INVENTION

In the sensor of angular velocity according to the present invention, the primary motion, which has to be generated, is an angular oscillation of at least two movable seismic masses in opposite phase about support areas attaching the masses to the body of the sensor component. There is at least one support area for each mass, and they are connected to the surrounding mass by means of springs, or by means of springs and stiff auxiliary structures, giving the masses a degree of freedom in relation to an axis of rotation perpendicular to the plane of the disk, and in relation to at least one axis of rotation in the same direction as the plane of the disk. The masses are connected to each other by means of at least one bending spring, which mechanically synchronizes their primary motion. Structures known in the art can be used for generating the motion.

Figure 1:
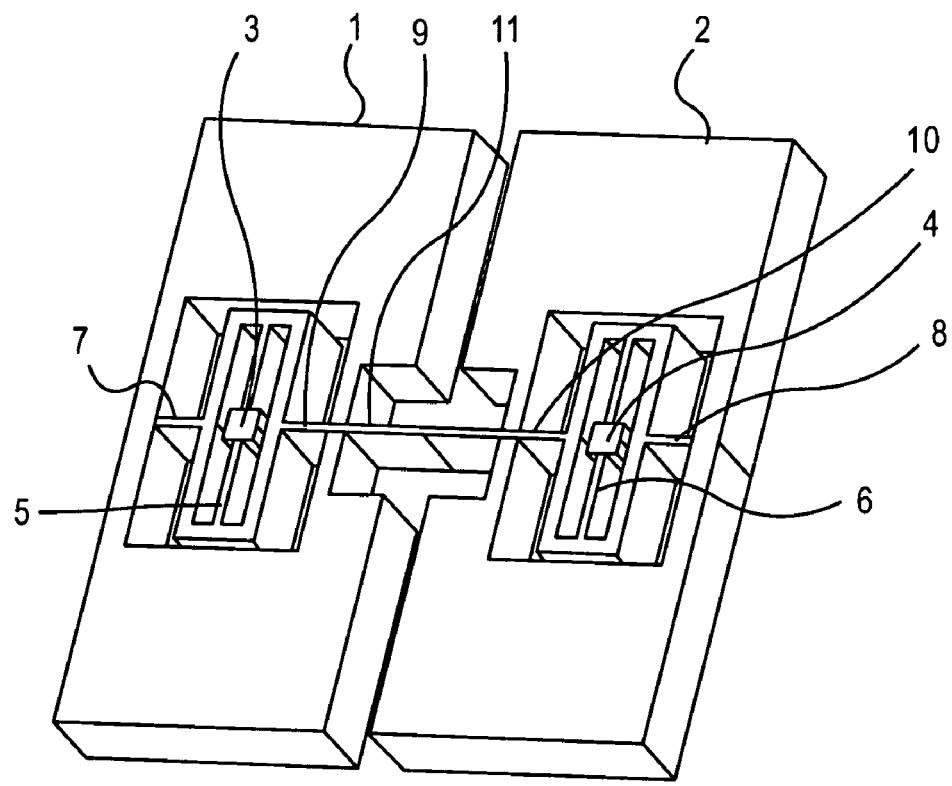
FIG. 1 shows a perspective depiction of the structure of the movable masses of an oscillating sensor of angular velocity according to the present invention.

FIG. 1 shows a perspective depiction of the structure of the movable masses of an oscillating sensor of angular velocity according to the present invention. The sensor of angular velocity according to the present invention comprises two seismic masses 1, 2 attached to the body of the sensor component at two attachment spots 3, 4. The attachment spots 3, 4 at the center of the masses 1, 2 can be joined to the body of the component, for example, in an anodic manner or by means of a fusion joint.

The sensor of angular velocity according to the present invention further comprises rotary springs 5, 6 for the primary motion, torsion springs 7-10 for the detection motion, and a bending spring 11 connecting the seismic masses 1, 2 to each other.

Figure 2:
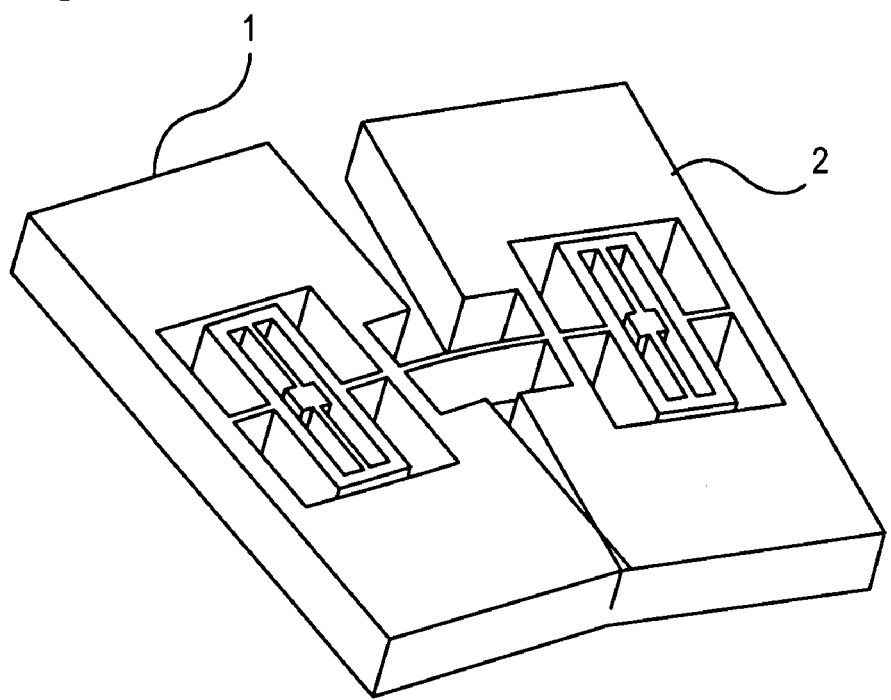
FIG. 2 shows the movable masses of an oscillating sensor of angular velocity according to the present invention, in primary motion.

FIG. 2 shows the movable masses of an oscillating sensor of angular velocity according to the present invention, in primary motion. The sensor of angular velocity according to the present invention is activated into primary motion such, that the generated primary motion is an opposite phase angular oscillation of two seismic masses 1, 2 about attachment spots 3, 4 attaching the masses 1, 2 to the body of the sensor component.

A centrally located long spring 11, connecting the resonators, synchronizes the motion of the masses 1, 2 into opposite phase to each other. Further, the connecting spring 11, being essentially higher than wide, prevents a torsion mode, in the direction of the axis Y, of the frames surrounding the attachment spots 3, 4, and thus the frames essentially have a degree of freedom only in the direction of the axis Z.

Both masses 1, 2 of the oscillating sensor of angular velocity according to the present invention are attached to frames surrounding the attachment spots 3, 4 by means of two torsion springs 7-10 extending in the direction of the axis X. Thus, the seismic masses 1, 2 have two degrees of freedom, one degree of freedom in relation to the axis Z, and the other degree of freedom in relation to the axis X, which enables the component's operation as a sensor of angular velocity.

Figure 3:
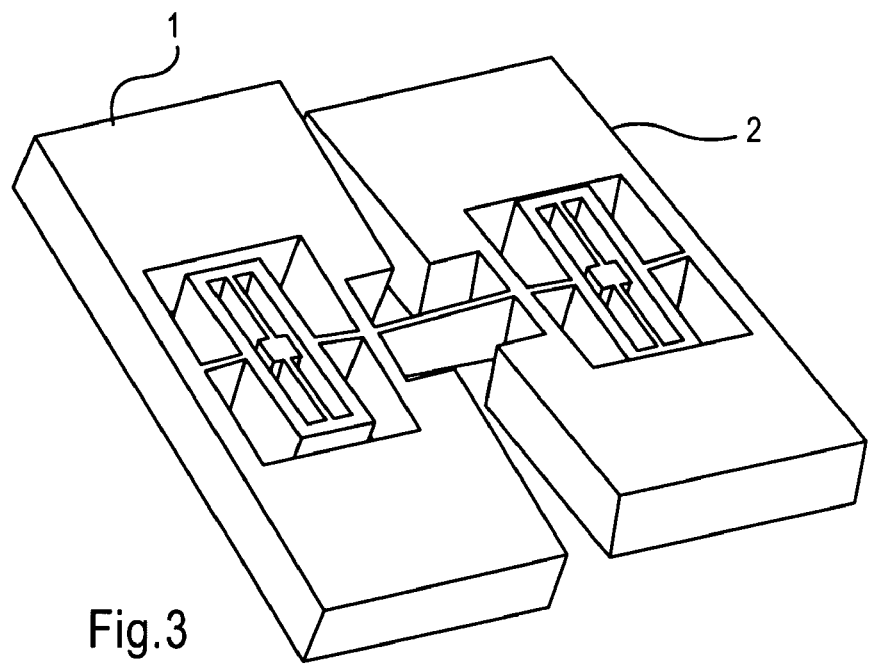
FIG. 3 shows the movable masses of an oscillating sensor of angular velocity according to the present invention, in detection motion.

FIG. 3 shows the movable masses of an oscillating sensor of angular velocity according to the present invention, in detection motion. In the oscillating sensor of angular velocity according to the present invention, the external angular velocity in relation to the axis Y links the opposite phase primary motions, in the direction of the axis Z, of the masses 1, 2 into oppositely directed torque moments about the axis X. The torque moments generate an opposite phased torsion oscillation, of the same frequency as that of the primary motion, about the detection axis of the mass 1, 2 of the masses in the direction of the axis X. In the sensor of angular velocity according to the present invention, the torsion springs 7-10 for the detection motion have flexibility in relation to the torsion oscillation.

In the oscillating sensor of angular velocity according to the present invention, the amplitude of the oscillation caused by an external angular velocity is directly proportional to the angular velocity, and it can be detected, for example, in a capacitive manner by means of electrodes positioned above or underneath the masses 1, 2, which electrodes may, for example, be grown onto the inner surface of wafers hermetically closing the sensor structure.

Figure 4:
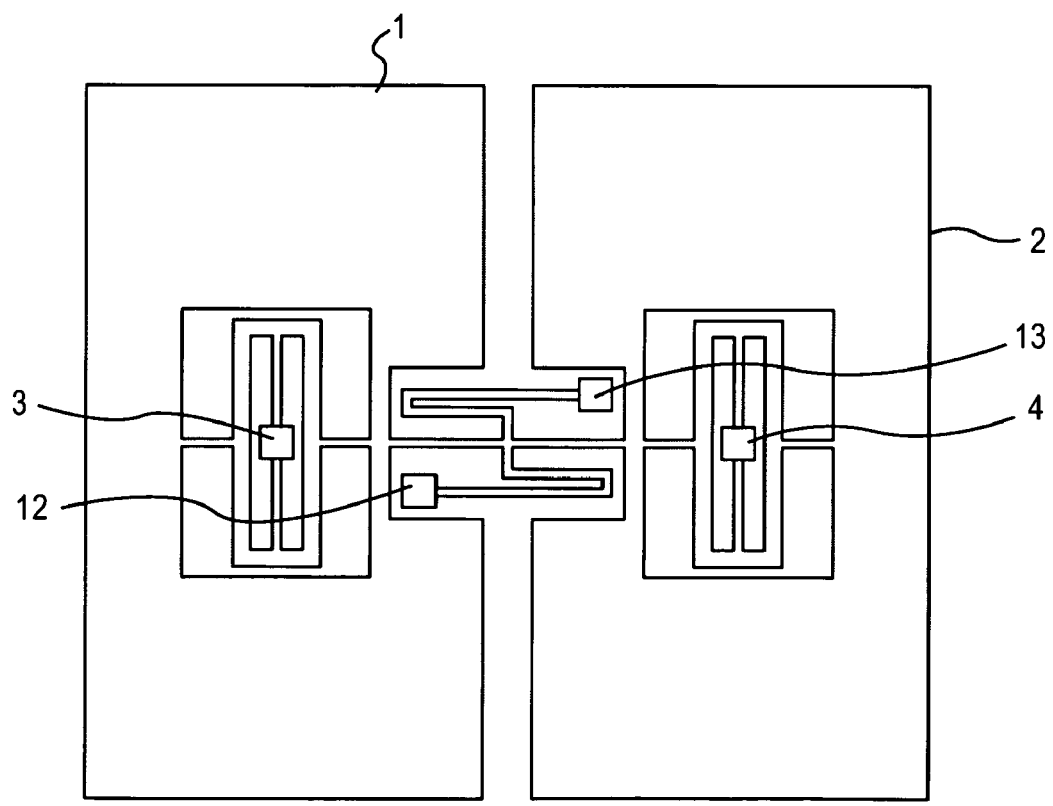
FIG. 4 shows an alternative structure of the movable masses of an oscillating sensor of angular velocity according to the present invention.

FIG. 4 shows an alternative structure of the movable masses of an oscillating sensor of angular velocity according to the present invention. In the alternative oscillating sensor of angular velocity according to the present invention any twisting of the connecting spring is reduced at its center by means of additional bending springs. This increase in the torsion stiffness of the connecting spring makes the structure more rigid in view of common mode motion of the masses generated by external interference, with essentially no stiffening of the primary mode or of the detection mode.

In the alternative oscillating sensor of angular velocity according to the present invention, the masses 1, 2 are attached to the body by means of attachment spots 3, 4 and, additionally, by means of attachment spots 12, 13 positioned at the center. The attachment spots 12, 13 may be joined to the body of the component, for example, in an anodic manner or by means of a fusion joint.

Figure 5:
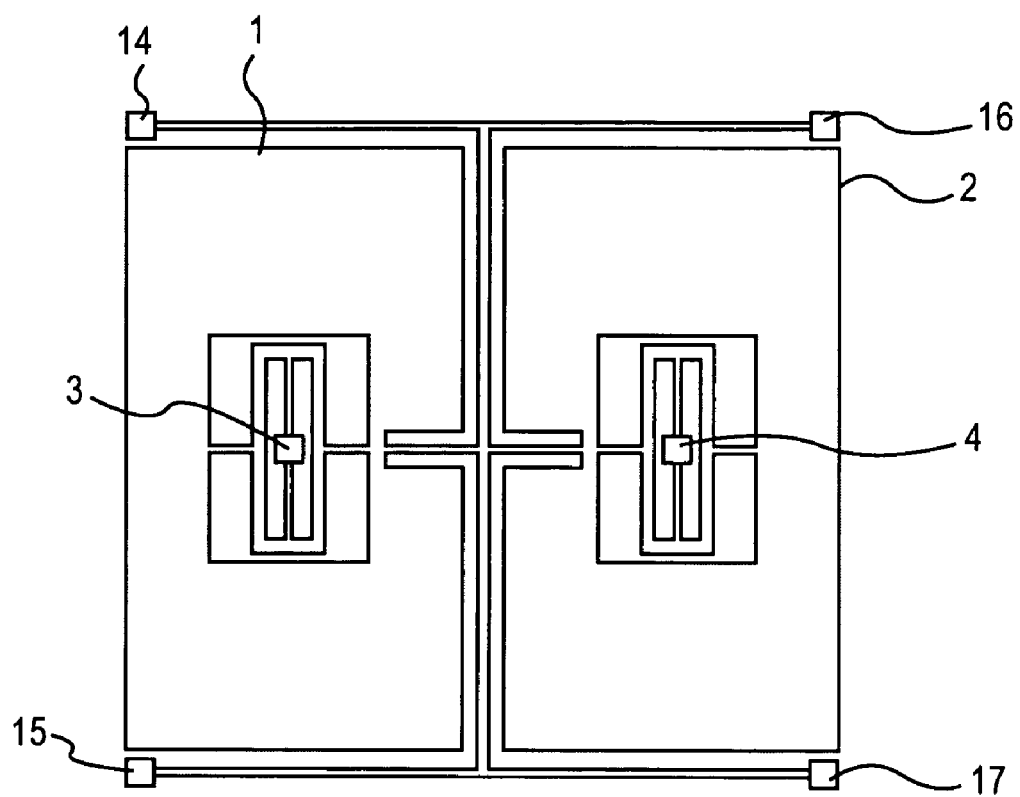
FIG. 5 shows a second alternative structure of the movable masses of an oscillating sensor of angular velocity according to the present invention.

FIG. 5 shows a second alternative structure of the movable masses of an oscillating sensor of angular velocity according to the present invention. In the second alternative oscillating sensor of angular velocity according to the present invention any twisting of the connecting spring is reduced by means of additional bending springs extending from the center of the connecting spring to the corners. This increase in the torsion stiffness of the connecting spring makes the structure more rigid in view of common mode motion of the masses generated by external interference, with essentially no stiffening of the primary mode or of the detection mode.

In the second alternative oscillating sensor of angular velocity according to the present invention, the masses 1, 2 are attached to the body by means of attachment spots 3, 4 and, additionally, by means of attachment spots 14-17 positioned at the corners. The attachment spots 14-17 may be integrated in the body directly at the edge area, or they may be joined to the body of the component, for example, in an anodic manner or by means of a fusion joint.

Figure 6:
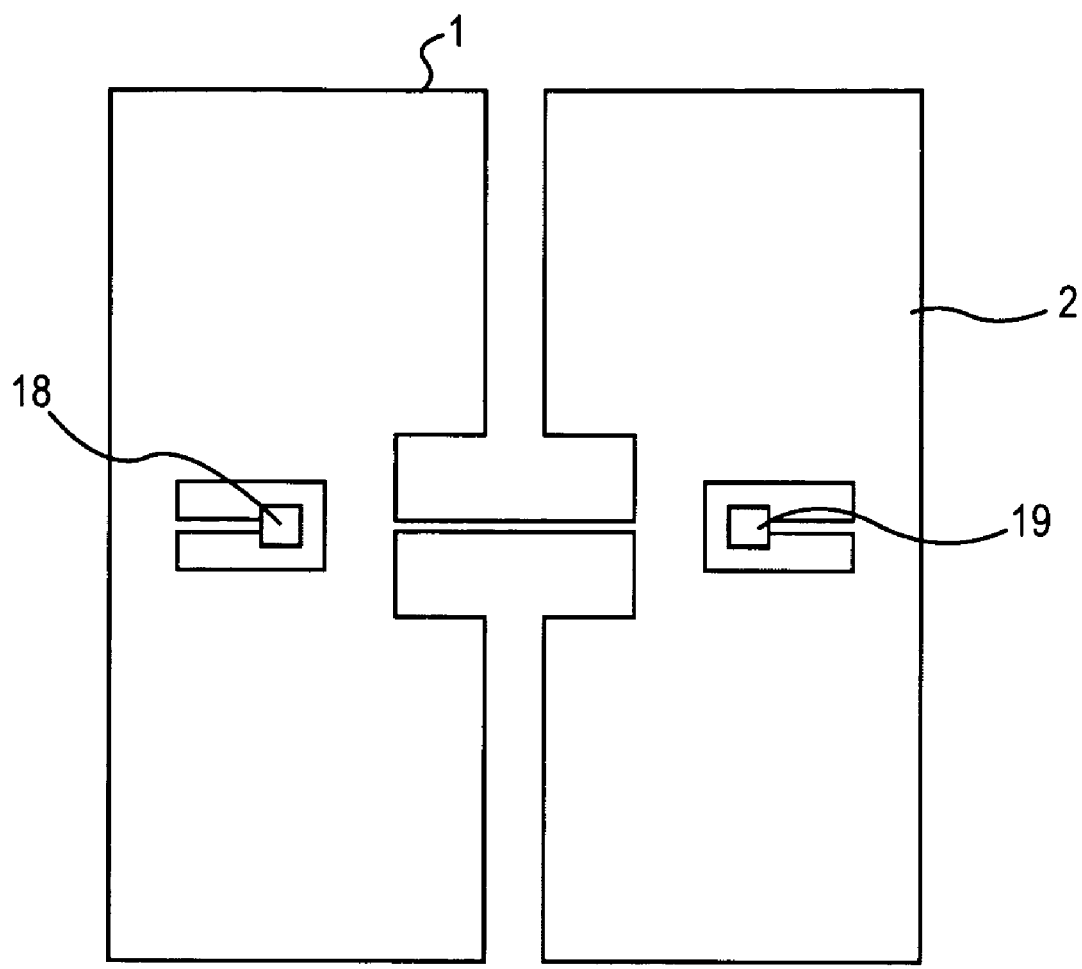
FIG. 6 shows a third alternative structure of the movable masses of an oscillating sensor of angular velocity according to the present invention.

FIG. 6 shows a third alternative structure of the movable masses of an oscillating sensor of angular velocity according to the present invention. In the third alternative oscillating sensor of angular velocity according to the present invention, the masses 1, 2 are attached to the body by means of attachment spots 18, 19, which attachment spots 18, 19, at one side, are attached to the masses 1, 2 by means of springs. The attachment spots 18, 19 may be joined to the body of the component, for example, in an anodic manner or by means of a fusion joint.

The third alternative structure of the movable electrodes of the oscillating sensor of angular velocity according to the present invention is slightly more complex in view of spring dimension design, and it also increases the coupling between the modes, since the same springs participate in both the primary and the detection mode. On the other hand, the third alternative structure described above has the advantages of more efficient space utilization and greater simplicity.

Figure 7:
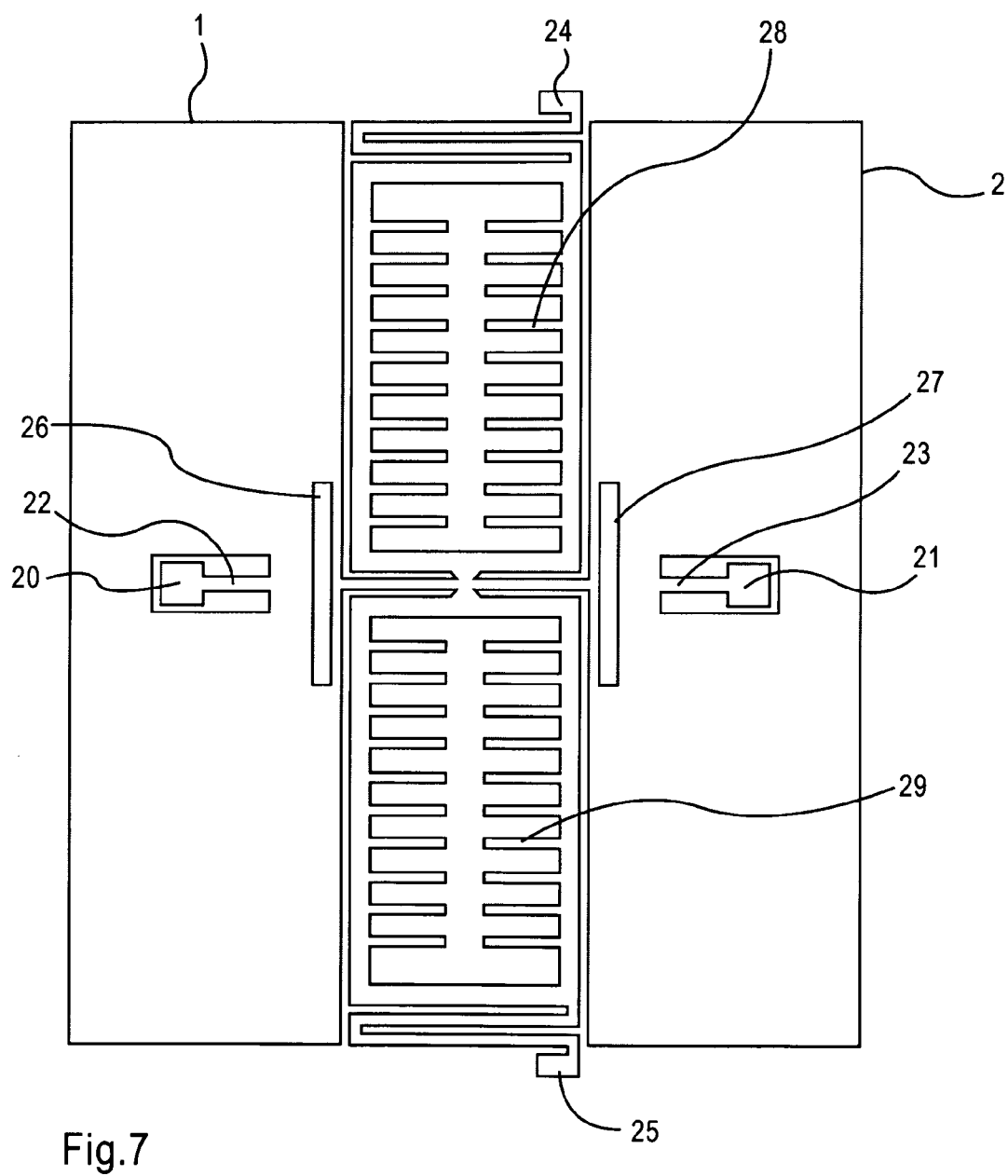
FIG. 7 shows a fourth alternative structure of the movable masses of an oscillating sensor of angular velocity according to the present invention.

FIG. 7 shows a fourth alternative structure of the movable masses of an oscillating sensor of angular velocity according to the present invention. In the fourth alternative oscillating sensor of angular velocity according to the present invention, the masses 1, 2 are attached to the body by means of attachment spots 20, 21 and, additionally, by means of attachment spots 24, 25 positioned at the center of the ends. The attachment spots 20, 21 are, at one side, attached to the masses 1, 2 by means of springs 22, 23. The attachment spots 20, 21, 24, 25 may be joined to the body of the component, for example, in an anodic manner or by means of a fusion joint. In the fourth alternative oscillating sensor of angular velocity according to the present invention, there are further strain relieving structures 26, 27 for reducing non-linear features in the springs, and a comb structure 28, 29 for the electrostatic generation, maintaining or detection of the primary motion.

Figure 8:
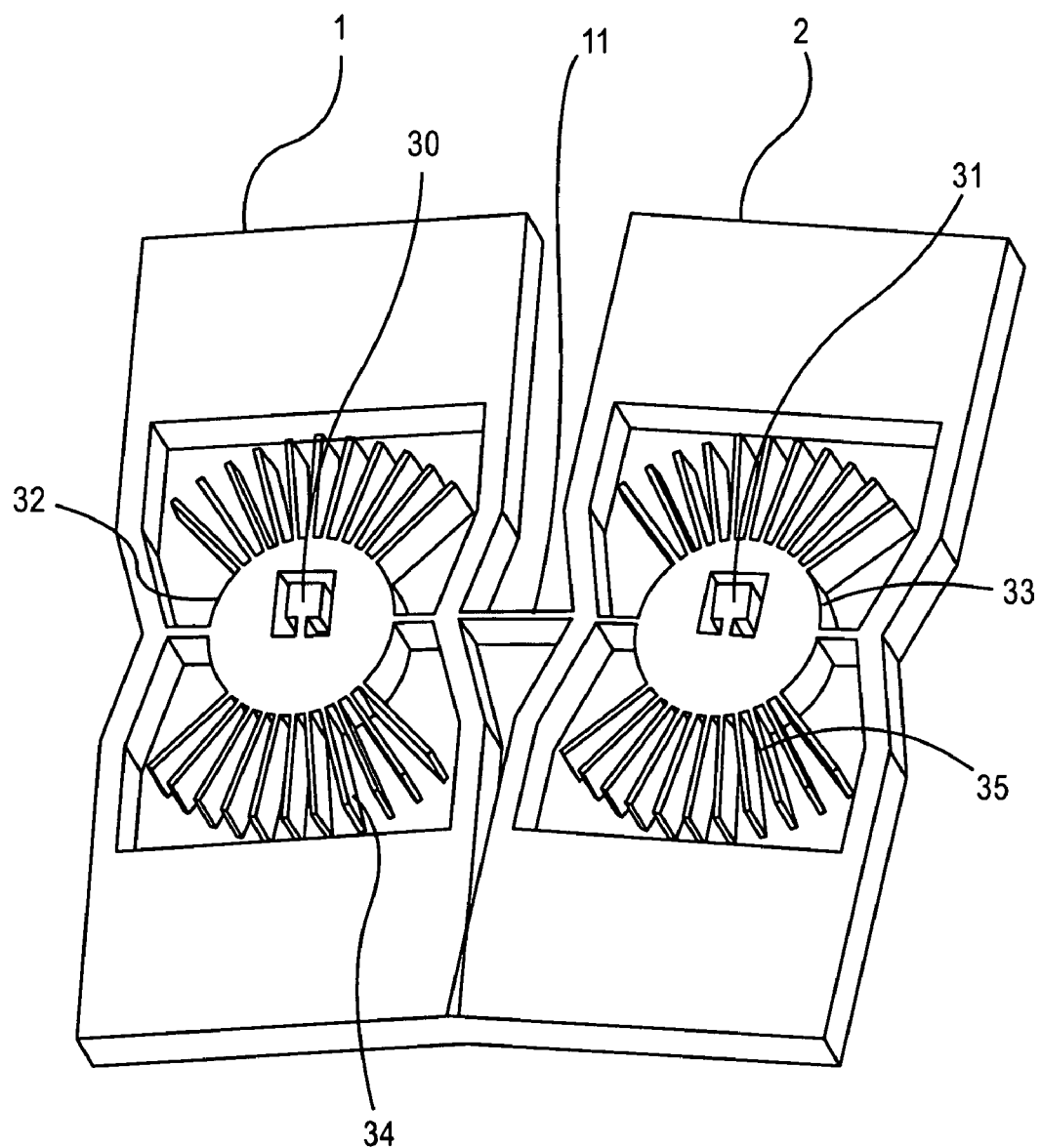
FIG. 8 shows the movable masses of a fifth alternative oscillating sensor of angular velocity according to the present invention, in primary motion.

FIG. 8 shows the movable masses of a fifth alternative oscillating sensor of angular velocity according to the present invention, in primary motion. In the fifth alternative oscillating sensor of angular velocity according to the present invention, the masses 1, 2 are attached to the body by means of attachment spots 30, 31, which attachment spots 30, 31 are attached, on one side, to the masses 1, 2 by means of stiff auxiliary structures 32, 33. The attachment spots 30, 31 may be joined to the body of the component, for example, in an anodic manner or by means of a fusion joint. In the fifth alternative oscillating sensor of angular velocity according to the present invention, there are additionally radial comb structures 34, 35 and a bending spring 11 connecting the seismic masses 1, 2 to each other.

Figure 9:
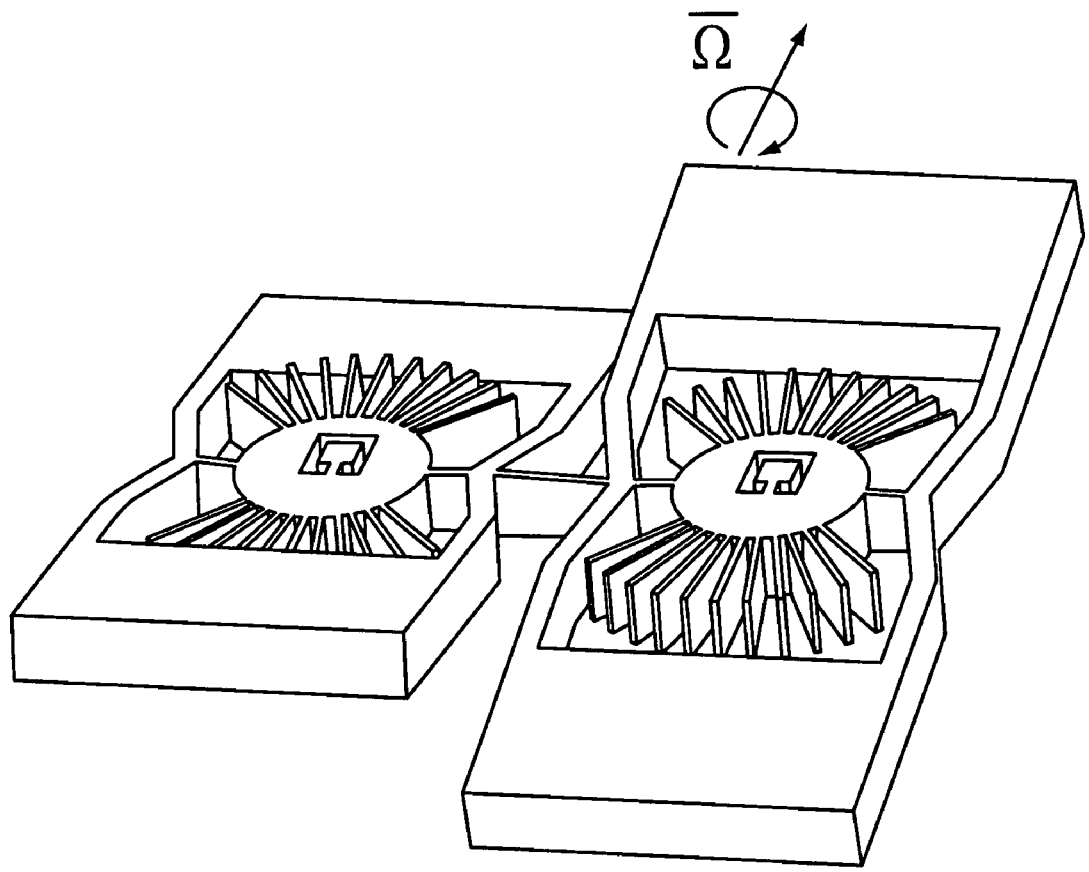
FIG. 9 shows the movable masses of the fifth alternative oscillating sensor of angular velocity according to the present invention, in detection motion.

FIG. 9 shows the movable masses of the fifth alternative oscillating sensor of angular velocity according to the present invention, in detection motion.

In addition to the structures described above, there are many other ways of creating the two degrees of freedom for the masses, which degrees of freedom are required for the measuring of angular velocity according to the invention.

Figure 10:
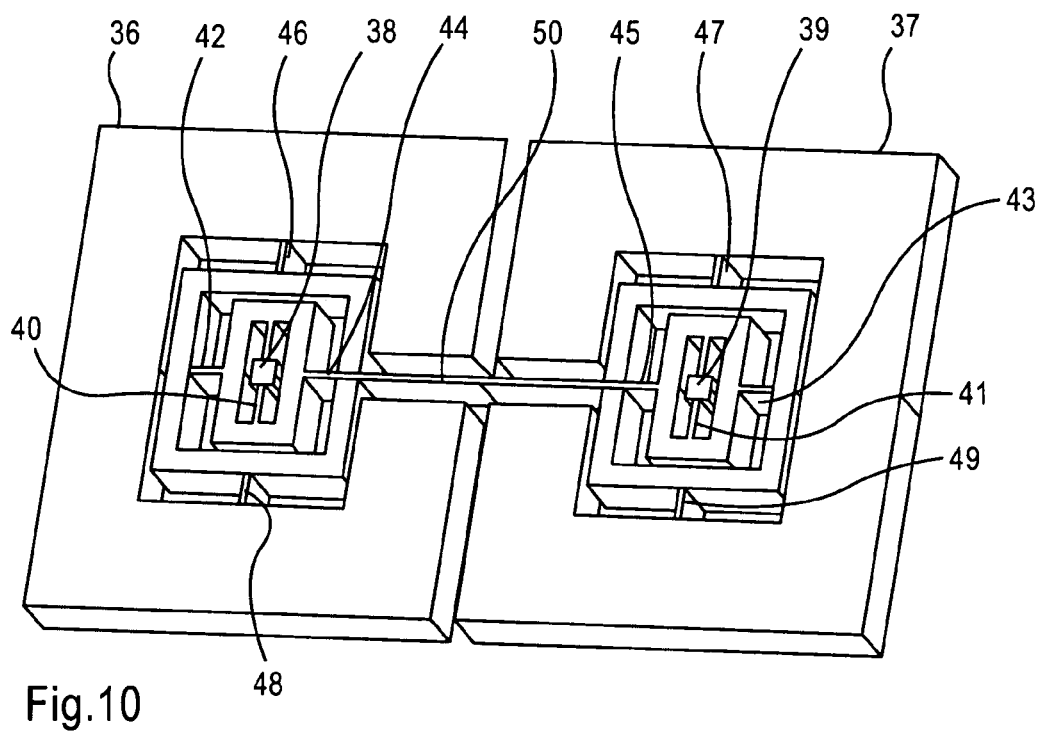
FIG. 10 shows a perspective depiction of the structure of the movable masses of an oscillating sensor of angular velocity with two axes according to the present invention.

FIG. 10 shows a perspective depiction of the structure of the movable masses of an oscillating sensor of angular velocity with two axes according to the present invention. The sensor of angular velocity measuring angular velocity in relation to two axes according to the present invention comprises two seismic masses 36, 37 attached to the body of the sensor component by means of two attachment spots 38, 39. The oscillating sensor of angular velocity with two axes according to the present invention further comprises rotary springs 40, 41 for the primary motion, torsion springs 42-45 for the detection motion in a first direction, torsion springs 46-49 for the detection motion in a second direction, and a bending spring 50 connecting the two seismic masses 36, 37 to each other.

The long centrally located spring 50 connecting the resonators 36, 37 synchronizes the motion of the masses into a mutually opposite phase motion. Additionally the connecting spring 50, being essentially higher than wide, prevents the torsion mode in the direction of the axis Y of the frames surrounding the attachment spots 38, 39, whereby the frames have a degree of freedom essentially in the direction of the axis Z.

Compared with the previously described structure with one axis, the structure of the oscillating sensor of angular velocity with two axes according to the present invention includes additional stiff auxiliary structures, which are suspended by springs to the masses 36, 37 by means of pairs of torsion springs 46-49 extending in the direction of the axis Y. The structure of the sensor of angular velocity with two axes according to the present invention gives the seismic mass 36, 37 a second degree of freedom perpendicular to the primary motion, enabling the sensor to operate as a sensor of angular velocity with two axes by utilizing the same primary motion.

Figure 11:
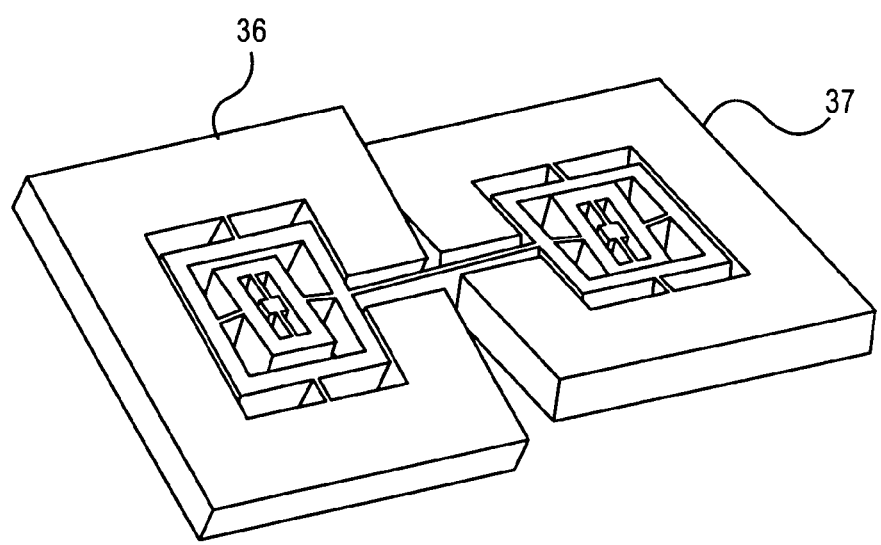
FIG. 11 shows the movable masses of an oscillating sensor of angular velocity with two axes according to the present invention, in detection motion caused by angular velocity in relation to an axis Y.

FIG. 11 shows the movable masses of an oscillating sensor of angular velocity with two axes according to the present invention, in detection motion caused by angular velocity in relation to an axis Y. In the oscillating sensor of angular velocity with two axes according to the present invention, the external angular velocity in relation to the axis Y, which is to be measured, couples the opposite phase primary motions in relation to the axis Z, of the masses 36, 37, into opposite phase torque moments in relation to the axis X. The torque moments generate an opposite phase torsion oscillation of the mass 36, 37 of the masses about the detection axis parallel to the axis X. In the sensor of angular velocity with two axes according to the present invention the torsion springs 42-45 for the detection motion have flexibility in relation to the torsion oscillation.

Figure 12:
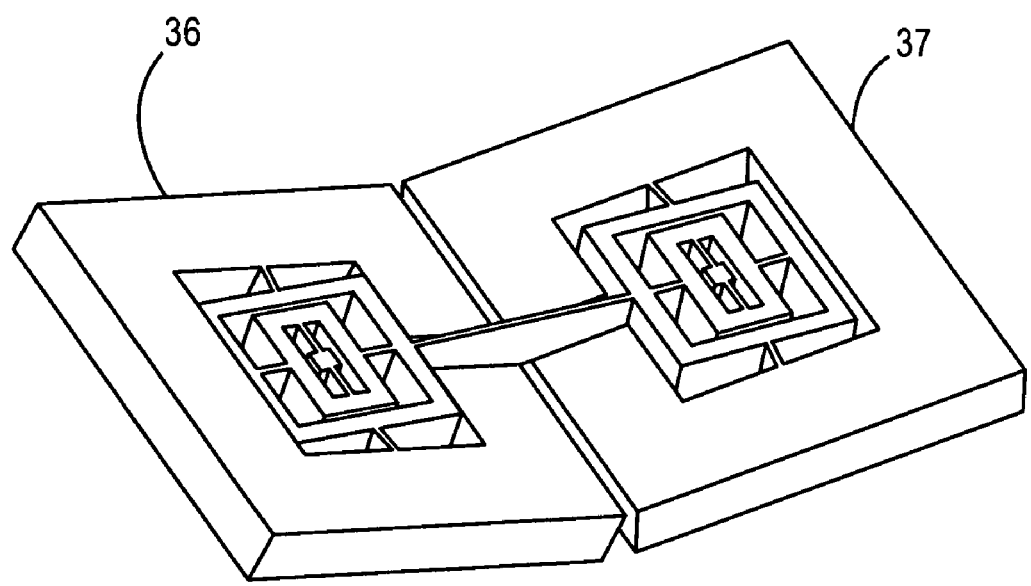
FIG. 12 shows the movable masses of an oscillating sensor of angular velocity with two axes according to the present invention, in detection motion caused by angular velocity in relation to an axis X.

FIG. 12 shows the movable masses of an oscillating sensor of angular velocity with two axes according to the present invention, in detection motion caused by angular velocity in relation to an axis X. In the oscillating sensor of angular velocity with two axes according to the present invention, an angular velocity to the item to be measured, in relation to the axis X, couples the opposite phase primary motion in the direction of the axis Z of the masses 36, 37 into opposite phase torque moments in relation to the axis Y. The torque moments generate an opposite phase torsion oscillation of the masses, of the same frequency as the primary motion, about the detection axis of the mass 36, 37 of the masses, parallel to the axis Y. In the sensor of angular velocity with two axes according to the present invention, the torsion springs 46-49 for the detection motion have flexibility in relation to the torsion oscillation.

In the oscillating sensor of angular velocity with two axes according to the present invention, the oscillation caused by the external angular velocity is directly proportional to the angular velocity, and it can be detected, for example, in a capacitive manner by means of electrodes situated above or beneath the masses 36, 37, which electrodes can be grown, for example, onto the inner surface of wafers hermetically closing the sensor structure.

In addition to the exemplifying structure, a multitude of variations of a sensor of angular velocity with two axes, within the scope of the invention, can be presented.

The most important advantage of the oscillating sensor of angular velocity according to the present invention, compared with sensor structures according to prior art, is an essentially improved resistance in the angular velocity signal to vibration and impact from its surroundings. In the sensor of angular velocity according to the present invention, the angular velocity generates an opposite phase motion in the masses in relation to the common detection axis, which is detected by means of a differential detection circuit for the masses.

In the oscillating sensor of angular velocity with two axes according to the present invention, a linear acceleration caused by an external angular acceleration and by any mass asymmetry of the masses causes a moment to the masses in equal phase. The signal caused by a motion in equal phase will be cancelled in the differential detection, and thus, in case of an ideally symmetrical structure, an external mechanical interference can affect the output only in a completely overloaded situation.

The oscillating sensor of angular velocity according to the present invention also enables an extremely high signal level, due to careful consideration of directions of motion. The large moment of inertia, brought about by the length of the seismic masses, can efficiently be utilized, for example, by means of large electrodes positioned above or underneath the mass.

An advantage of the structure of the oscillating sensor of angular velocity according to the present invention is also the distinctiveness in the various modes of the deformations in the springs, particularly in structures of the type with frames, which springs essentially determine the frequencies and directions of the modes of motion.

The invention claimed is:

1. An oscillating micro-mechanical sensor of angular velocity, said sensor comprising:
    two seismic masses which are attached to the body of a sensor component at support areas;
    a connecting spring between the seismic masses, such that a primary motion of the sensor of angular velocity, which motion must be generated, is an opposite phase angular oscillation of the two seismic masses about the support areas; and
    at least on bending spring which connects the seismic masses, said at least one bending spring mechanically synchronizes the primary motion of the seismic masses, and that the seismic masses are connected to the support areas by at least one of springs and stiff auxiliary structures, which give the seismic masses a degree of freedom in relation to an axis of rotation perpendicular to the plane of the disk formed by the seismic masses, and in relation to at least one axis of rotation in the direction of the plane of said disk.

2. Sensor of angular velocity according to claim 1, wherein the sensor is a sensor of angular velocity as measured in relation to one axis, and the two seismic masses are attached to the body of the sensor component in at least two attachment spots.

3. Sensor of angular velocity according to claim 2, wherein the bending spring is essentially higher than it is wide.

4. Sensor of angular velocity according to claim 2, wherein the sensor of angular velocity comprises: rotary springs configured to perform a primary motion, which rotary springs have flexibility in relation to the primary motion direction, and torsion springs configured to perform a detection motion, which springs have flexibility in relation to a torsion oscillation caused by a torque moment generated by an external angular velocity.

5. Sensor of angular velocity according to claim 2, wherein the oscillation caused by an external angular velocity is detected in a capacitive manner using electrodes located above or underneath the seismic masses.

6. Sensor of angular velocity according to claim 5, wherein the electrodes are grown onto the inner surface of a wafer hermetically closing the sensor structure.

7. Sensor of angular velocity according to claim 2, wherein the sensor of angular velocity further comprises:

a second bending spring extending essentially in the same direction as, and attached at the center point of, the second bening spring connecting the seismic masses of the sensor of angular velocity.

8. Sensor of angular velocity according to claim 2, wherein the seismic masses are attached to the body of the sensor component at least two first attachment spots, and additionally attached by ef at least two second attachment spots, said at least two second attachments spots being installed at the center.

9. Sensor of angular velocity according to claim 2, wherein the seismic masses are attached to the body of the sensor component by at least two first attachment spots, and additionally by at least to second attachment spots installed in the corners or at the edge.

10. Sensor of angular velocity according to claim 2, wherein the seismic masses are attached to the body of the sensor component by at least two first attachment spots, which said attachment spots at one side are attached to the seismic masses by stiff auxiliary structures.

11. Sensor of angular velocity according to claim 2, wherein the seismic masses are attached to the body of the sensor component by at least two attachment spots, which said attachment spots at one side are attached to the seismic masses by means of springs.

12. Sensor of angular velocity according to claim 2, wherein the seismic masses are attached to the body of the sensor component by at least two first attachment spots, which are installed at the center of the ends, and additionally by at least two second attachment spots, which at one side, are attached to the seismic masses by spring.

13. Sensor of angular velocity according to claim 2, wherein the sensor of angular velocity comprises:
    strain relieving structures.

14. Sensor of angular velocity according to claim 2, wherein the sensor of angular velocity comprises:
    a comb structure.

15. Sensor of angular velocity according to claim 2, wherein the sensor of angular velocity comprises:
    radial comb structures.

16. Sensor of angular velocity according to claim 1, wherein the sensor of angular velocity is a sensor of angular velocity measuring angular velocity in relation to two axes, the sensor containing two seismic masses attached to the body of the sensor component at two attachment spots.

17. Sensor of angular velocity according to claim 16, wherein the bending spring is essentially higher than it is wide.

18. Sensor of angular velocity according to claim 16, wherein the sensor of angular velocity comprises:
    rotary springs configured to provide the primary motion of angular velocity, which said rotary springs have flexibility in relation to the primary motion of angular velocity;
    first torsion springs configured to detect motion in a first direction, which said first torsion springs have flexibility in relation to the detection of motion in the first direction; and
    second torsion springs configured to detect motion in a second direction, which said second springs have flexibility in relation to the detection of motion in the second direction.

19. Sensor of angular velocity according to claim 16, wherein the oscillation caused by external angular velocity is detected in a capacitive manner by electrodes located above or underneath the seismic masses.

20. Sensor of angular velocity according to claim 19, wherein the electrodes are grown onto the inner surface of a wafer hermetically closing the sensor structure.

21. Sensor of angular velocity according to claim 2, wherein the attachment spots are joined in an anodic manner to the wafer hermetically closing the sensor structure.

22. Sensor of angular velocity according to claim 2, wherein the attachment spots are joined to the wafer by a fusion joint hermetically closing the sensor structure.

23. An apparatus, comprising:
    attaching means for attaching two seismic masses to the body of a sensor component at support areas;
    spring connecting means for connecting a spring between the seismic masses, such that a primary motion of angular velocity, which motion must be generated, is an opposite phase angular oscillation of the two seismic masses about the support areas; and
    bending spring connecting means for connecting a bending spring between the seismic masses, said at least one bending spring mechanically synchronizes the primary motion of the seismic masses, and that the seismic masses are connected to the support areas by at least one of springs and stiff auxiliary structures, which give the seismic masses a degree of freedom in relation to an axis of rotation perpendicular to the plane of the disk formed by the seismic masses, and in relation to at least one axis of rotation in the direction of the plane of said disk.

* * * * *